(12) United States Patent
Lu

(10) Patent No.: US 10,303,232 B2
(45) Date of Patent: May 28, 2019

(54) COMPUTER POWER SUPPLY UNIT WITH OUTPUT MODE DETERMINING FUNCTION

(71) Applicant: RYANTEK CO., LTD, New Taipei (TW)

(72) Inventor: Liang-Chun Lu, New Taipei (TW)

(73) Assignee: Ryantek Co., Ltd., New Taipei (TW)

( * ) Notice: Subject to any disclaimer, the term of this patent is extended or adjusted under 35 U.S.C. 154(b) by 63 days.

(21) Appl. No.: 15/716,519

(22) Filed: Sep. 27, 2017

(65) Prior Publication Data

US 2019/0094932 A1 Mar. 28, 2019

(51) Int. Cl.
*G06F 1/26* (2006.01)
*G06F 1/3287* (2019.01)

(52) U.S. Cl.
CPC ............ *G06F 1/263* (2013.01); *G06F 1/3287* (2013.01)

(58) Field of Classification Search
CPC .............................. G06F 1/263; G06F 1/3287
See application file for complete search history.

(56) References Cited

U.S. PATENT DOCUMENTS

2014/0164803 A1* 6/2014 Huynh .................. G06F 1/3206
713/323

FOREIGN PATENT DOCUMENTS

| TW | I399900 B1 | 6/2013 |
| TW | I486755 B | 6/2015 |
| TW | I584111 B | 5/2017 |

* cited by examiner

*Primary Examiner* — Daniel J Cavallari
(74) *Attorney, Agent, or Firm* — C. G. Mersereau; DeWitt LLP

(57) ABSTRACT

A computer power supply unit with output mode determining function includes a voltage difference amplification circuit, a comparison circuit, a linear voltage regulator circuit, a drive circuit and a clamp circuit. A diode is disposed between the first and second input ends of the voltage difference amplification circuit. According to whether the diode generates turn-on bias, the voltage difference amplification circuit outputs a first voltage level. According to the first voltage level and the value of the constant voltage, the comparison circuit outputs a second voltage level. According to the value of the second voltage level, the drive circuit drives or does not drive the clamp circuit so as to judge the output mode of the power supply unit.

20 Claims, 12 Drawing Sheets

COMPUTER POWER SUPPLY UNIT WITH OUTPUT MODE DETERMINING FUNCTION

BACKGROUND OF THE INVENTION

1. Field of the Invention

The present invention relates generally to a power supply unit, and more particularly to a computer power supply unit with output mode determining function.

2. Description of the Related Art

Please refer to FIG. 1, which is a block diagram showing that the double power supply units are in a power-coupling working mode. In case the ATX power supply unit supplies unregulated power or power with insufficient wattage, the system will be unstable or malfunction. Therefore, most of the users encounter the problem that the power of the original ATX power supply unit is insufficient so that it cannot provide sufficient wattage for the upgraded computer system. In order to solve this problem, a power supply unit technique for coupling the power of two power supply units with lower output power has been developed.

Please refer to FIG. 2, which is a block diagram showing that one single power supply unit is in a power-shunting working mode to provide power for two computer systems. Currently, there is a technique of using a high-power power supply unit to output power for two computer systems.

When either of the two computer systems is activated, the power supply unit is activated. Only when both the two computer systems are shut down, the power supply unit is turned off.

Currently, there is no power supply unit that can handle both the above two situations. Also, there is no determining system for judging the above two situations. It is therefore tried by the applicant to provide a computer power supply unit with output mode determining function to solve the above problem.

SUMMARY OF THE INVENTION

It is therefore a primary object of the present invention to provide a computer power supply unit, which can work in a power-coupling working mode and a power-shunting working mode.

It is a further object of the present invention to provide a computer power supply unit, which can automatically judge the current output mode.

To achieve the above and other objects, the computer power supply unit with output mode determining function of the present invention includes: a voltage difference amplification circuit having a first input end, a second input end and an output end, a diode being disposed between the first and second input ends; a comparison circuit having a first input end, a second input end and an output end, the second input end of the comparison circuit being connected to the output end of the voltage difference amplification circuit; a linear voltage regulator circuit having a first end and a second end, the first end of the linear voltage regulator circuit being connected to the first input end of the voltage difference amplification circuit, the second end of the linear voltage regulator circuit being connected to the first input end of the comparison circuit to output a constant voltage; a drive circuit having a first input end, a second input end and an output end, the first input end of the drive circuit being connected to the output end of the comparison circuit; and a clamp circuit having an input end, a first output end and a second output end, the input end of the clamp circuit being connected to the output end of the drive circuit.

According to whether the diode generates turn-on bias, the voltage difference amplification circuit outputs a first voltage level. According to the first voltage level and the value of the constant voltage, the comparison circuit outputs a second voltage level. According to the value of the second voltage level, the drive circuit drives or does not drive the clamp circuit so as to judge the output mode of the power supply unit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
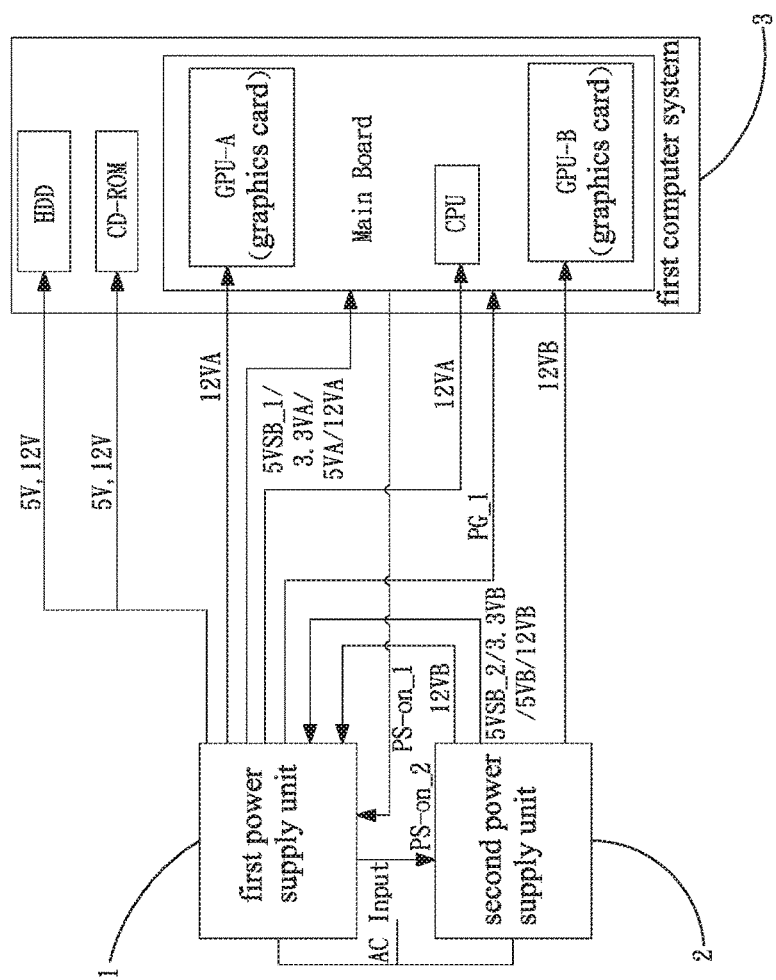
FIG. 1 is a block diagram showing that the double power supply units are in a power-coupling working mode.
Figure 2:
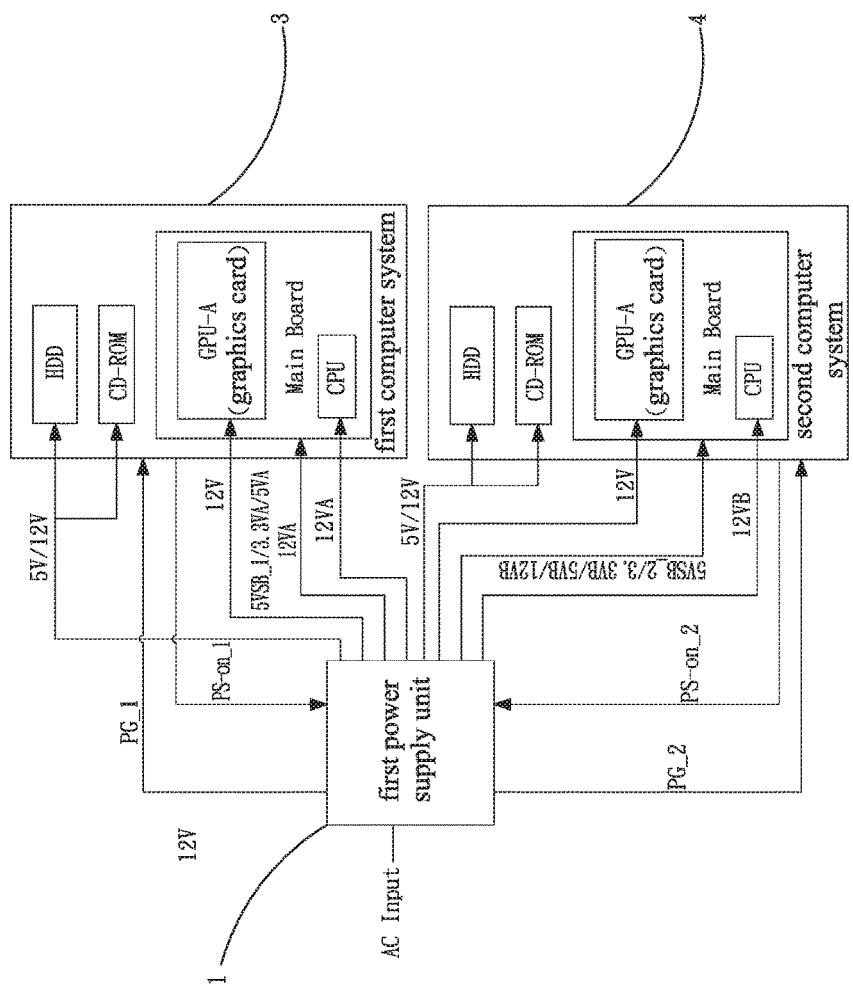
FIG. 2 is a block diagram showing that one single power supply unit is in a power-shunting working mode to provide power for two computer systems.
Figure 3A:
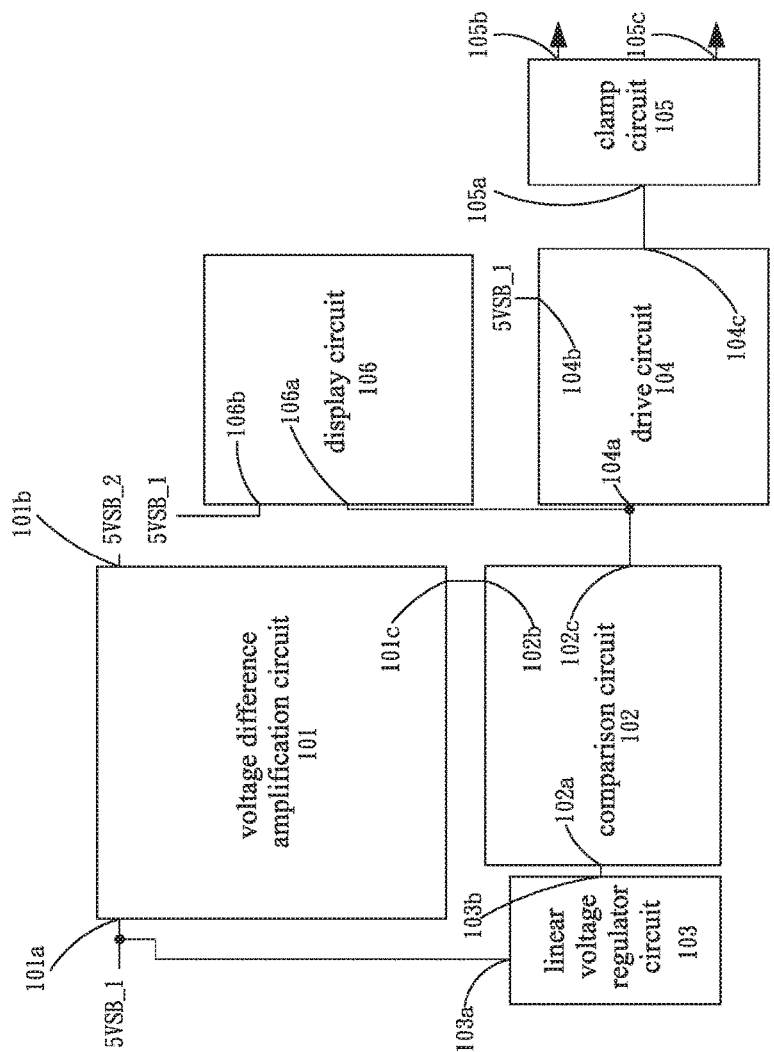
FIG. 3A is a block diagram of a first embodiment of the power supply unit of the present invention.
Figure 3B:
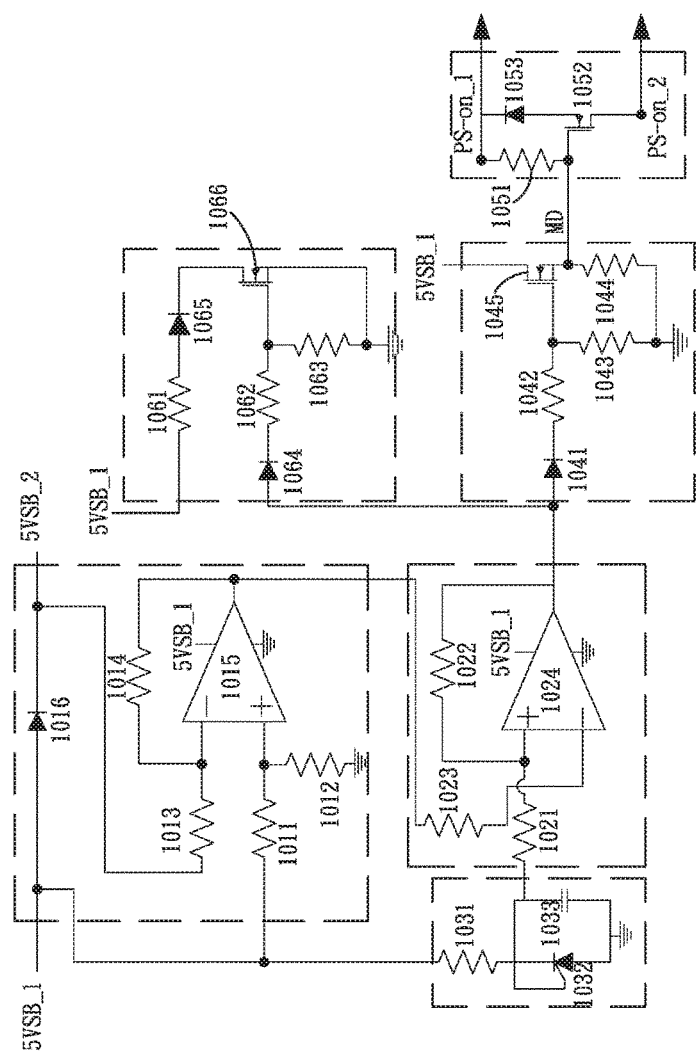
FIG. 3B is a circuit diagram of the first embodiment of the power supply unit of the present invention.

Please refer to FIGS. 3A and 3B and supplementally to FIGS. 1 and 2. FIG. 1 is a block diagram of the present invention, showing that the powers of double power supply units are coupled. FIG. 2 is a block diagram of the present invention, showing that one single power supply unit is connected to two computer systems for providing power to the two computer systems. FIG. 3A is a block diagram of a first embodiment of the power supply unit of the present invention. FIG. 3B is a circuit diagram of the first embodiment of the power supply unit of the present invention. According to the use requirement, the first power supply unit 1 of the present invention can selectively work in a power-coupling mode as shown in FIG. 1, in which the power of the second power supply unit 2 is first provided to the first power supply unit 1 and then the first power supply unit 1 outputs the power to the first computer system 3. Alternatively, the first power supply unit 1 of the present invention can selectively work in a power-shunting mode as shown in FIG. 2, in which the first power supply unit 1 provides power for the first computer system 3 or the second computer system 4. The circuit structure as shown in FIGS. 3A and 3B is disposed in the first power supply unit 1 to judge the output working mode.

It is here previously defined that the resistors and capacitors referred to hereinafter have no polarity or orientation. In the drawings, the upward or leftward end is defined as the first end, while the downward or rightward end is defined as the second end. The anode of the diode or the light-emitting diode is defined as the first end, while the cathode is defined as the second end. PS-on_1 and PS-on_2 are the activation signals transmitted from the computer system to the power supply unit.

The voltage difference amplification circuit 101 includes a first resistor 1011, a second resistor 1012, a third resistor 1013, a fourth resistor 1014 and an amplifier 1015. The second end of the first resistor 1011, the first end of the second resistor 1012 and the non-inverting input end of the amplifier 1015 are commonly connected. The first end of the first resistor 1011 is exactly the first input end 101a of the voltage difference amplification circuit 101. The second end of the second resistor 1012 is grounded. The second end of the third resistor 1013, the first end of the fourth resistor 1014 and the inverting input end of the amplifier 1015 are commonly connected. The first end of the third resistor 1013 is exactly the second input end 101b of the voltage difference amplification circuit 101. The second end of the fourth resistor 1014 is connected to the output end of the amplifier 1015. The output end of the amplifier 1015 is exactly the output end 101c of the voltage difference amplification circuit 101.

The comparison circuit 102 includes a first resistor 1021, a second resistor 1022, a third resistor 1023 and an amplifier 1024. The second end of the first resistor 1021, the first end of the second resistor 1022 and the non-inverting input end of the amplifier 1024 are commonly connected.

The first end of the first resistor 1021 is exactly the first input end 102a of the comparison circuit 102. The second end of the second resistor 1022 is connected to the output end of the amplifier 1024. The second end of the third resistor 1023 is serially connected to the inverting input end of the amplifier 1024. The first end of the third resistor 1023 is exactly the second input end 102b of the comparison circuit 102. The output end of the amplifier 1024 is exactly the output end 102c of the comparison circuit 102.

The linear voltage regulator circuit 103 includes a first resistor 1031, a voltage regulation member 1032 and a first capacitor 1033. The second end of the first resistor 1031 and the second end of the voltage regulation member 1032 are commonly connected. The first end of the first capacitor 1033 and the third end of the voltage regulation member 1032 are commonly connected. The second end of the first capacitor 1033 and the first end of the voltage regulation member 1032 are commonly grounded. The first end of the first resistor 1031 is exactly the first end 103a of the linear voltage regulator circuit 103. The commonly connected point of the first end of the first capacitor 1033 and the third end of the voltage regulation member 1032 is exactly the second end of the linear voltage regulator circuit 103.

The drive circuit 104 includes a diode 1041, a first resistor 1042, a second resistor 1043, a third resistor 1044 and a transistor 1045. The second end of the diode 1041 and the first end of the first resistor 1042 are commonly connected. The second end of the first resistor 1042, the first end of the second resistor 1043 and the gate of the transistor 1045 are commonly connected. The second end of the second resistor 1043 and the second end of the third resistor 1044 are commonly grounded. The first end of the third resistor 1044 and the source of the transistor 1045 are commonly connected. The drain of the transistor 1045 is exactly the second input end 104b of the drive circuit 104. The source of the transistor 1045 is exactly the output end 104c of the drive circuit 104.

The clamp circuit 105 includes a first resistor 1051, a transistor 1052 and a diode 1053. The second end of the first resistor 1051 and the gate of the transistor 1052 are commonly connected. The first end of the diode 1053 and the source of the transistor 1052 are commonly connected. The second end of the diode 1053 and the second end of the first resistor 1051 are commonly connected. The gate of the transistor 1052 is exactly the input end 105a of the clamp circuit 105. The second end of the diode 1053 is exactly the first output end 105b of the clamp circuit 105. The drain of the transistor 1052 is exactly the second output end 105c of the clamp circuit 105.

The display circuit 106 includes a first resistor 1061, a second resistor 1062, a third resistor 1063, a diode 1064, a light-emitting diode 1065 and a transistor 1066. The second end of the first resistor 1061 and the first end of the light-emitting diode 1065 are commonly connected. The second end of the light-emitting diode 1065 and the drain of the transistor 1066 are commonly connected. The second end of the diode 1064 and the first end of the second resistor 1062 are commonly connected. The second end of the second resistor 1062, the first end of the third resistor 1063 and the gate of the transistor 1066 are commonly connected. The source of the transistor 1066 and the second end of the third resistor 1063 are commonly grounded. The first end of the first resistor 1061 is exactly the second input end 106b of the display circuit 106. The first end of the diode 1064 is exactly the first input end 106a of the display circuit 106.

The first input end 101a of the voltage difference amplification circuit 101, the second input end 104b of the drive circuit 104 and the second input end 106b of the display circuit 106 are connected to a standby power reference level 5VSB_1. The second input end 101b of the voltage difference amplification circuit 101 is connected to a virtual standby power reference level 5VSB_2. The resistance of the first resistor 1011 is equal to the resistance of the third resistor 1013. The resistance of the second resistor 1012 is equal to the resistance of the fourth resistor 1014.

The aforesaid standby power reference level 5VSB_1 is exactly the standby power of the first power supply unit 1. In the power-coupling working mode, the virtual standby power reference level 5VSB_2 is exactly the standby power of the second power supply unit 2. The standby voltage difference between the standby power of the first power supply unit 1 and the standby power of the second power supply unit 2 is very small (for example, the standby power reference level 5VSB_1 is 5.2v, while the virtual standby power reference level 5VSB_2 is 5.1v) so that it cannot satisfy the bias of the diode 1016. The voltage difference (such as 0.1v) is input to the inverting input end and non-inverting input end of the amplifier 1015 is amplified (such as ten times) and then the amplified voltage (0.1v× 10=1v) is output from the output end of the amplifier 1015 to the inverting input end of the amplifier 1024. The linear voltage regulator circuit 103 outputs a constant voltage (such as 2.5v) to the non-inverting input end of the amplifier 1024. According to the level of the voltage input to the inverting input end (1v) and the non-inverting input end (2.5v), the amplifier 1024 outputs a high voltage level, whereby the diode 1064 in the display circuit 106 forward turns on the transistor 1066 so that the light-emitting diode 1065 is turned on to emit light for an operator to know that the current mode is the power-coupling working mode. Similarly, the diode 1041 in the drive circuit 104 forward turns on the transistor 1045 to output a high level signal (MD) to the clamp circuit 105 to turn on the transistor 1052 in the clamp circuit 105. When the first compute system 3 sends out the boot-up command, the PS-on_1 of the first output end 105b will be pulled to the low voltage level. At this time, no matter whether the PS-on_2 of the second output end 105c is in the high level or the low level, the PS-on_2 will be pulled to the low level due to the turning on of the transistor 1052. The second power supply unit 2 will be activated because the PS-on_2 is in the low level. Accordingly, one control command can activate the first power supply unit 1 and the second power supply unit 2.

In the power-shunting working mode, the virtual standby power reference level 5VSB_2 is connected to the second computer system 4. At this time, the virtual standby power reference level 5VSB_2 is not connected to the active load. The voltage difference between the standby power of the first power supply unit 1 and the second computer system 4 is very large (the standby power reference level 5VSB_1 is 5.2v, while the virtual standby power reference level 5VSB_2 of the second computer system 4 is 0v) so that it satisfies the bias of the diode 1016 (generating about 0.35 voltage drop). The voltage difference (5.2v−4.85v=0.35v) is input to the inverting input end and non-inverting input end of the amplifier 1015 is amplified (such as ten times) and then the amplified voltage (0.35v×10=3.5v) is output from the output end of the amplifier 1015 to the inverting input end of the amplifier 1024. The linear voltage regulator circuit 103 outputs a constant voltage (such as 2.5v) to the non-inverting input end of the amplifier 1024. According to the level of the voltage input to the non-inverting input end (2.5v) and the inverting input end (3.5v), the amplifier 1024 outputs a low voltage level, whereby both the diode 1041 and the diode 1064 cannot be turned on so that the light-emitting diode 1065 in the display circuit 106 fails to emit light for an operator to know that the current mode is the power-shunting working mode. Also, the diode 1041 in the drive circuit 104 fails to turn on the transistor 1045 so that the clamp circuit 105 will not make the PS-on_1 and the PS-on_2 clamp each other.

The main function of the display circuit 106 is to indicate the current working mode of the first power supply unit 1 by means of the lighting/extinguishing of the light-emitting diode 1065. This will not substantially affect the output mode determining as a whole. Therefore, the display circuit 106 can be omitted to lower the cost. In addition, the light-emitting diode 1065 can be replaced with another type of component such as a speaker to indicate the working mode by means of sound.

Figure 4:
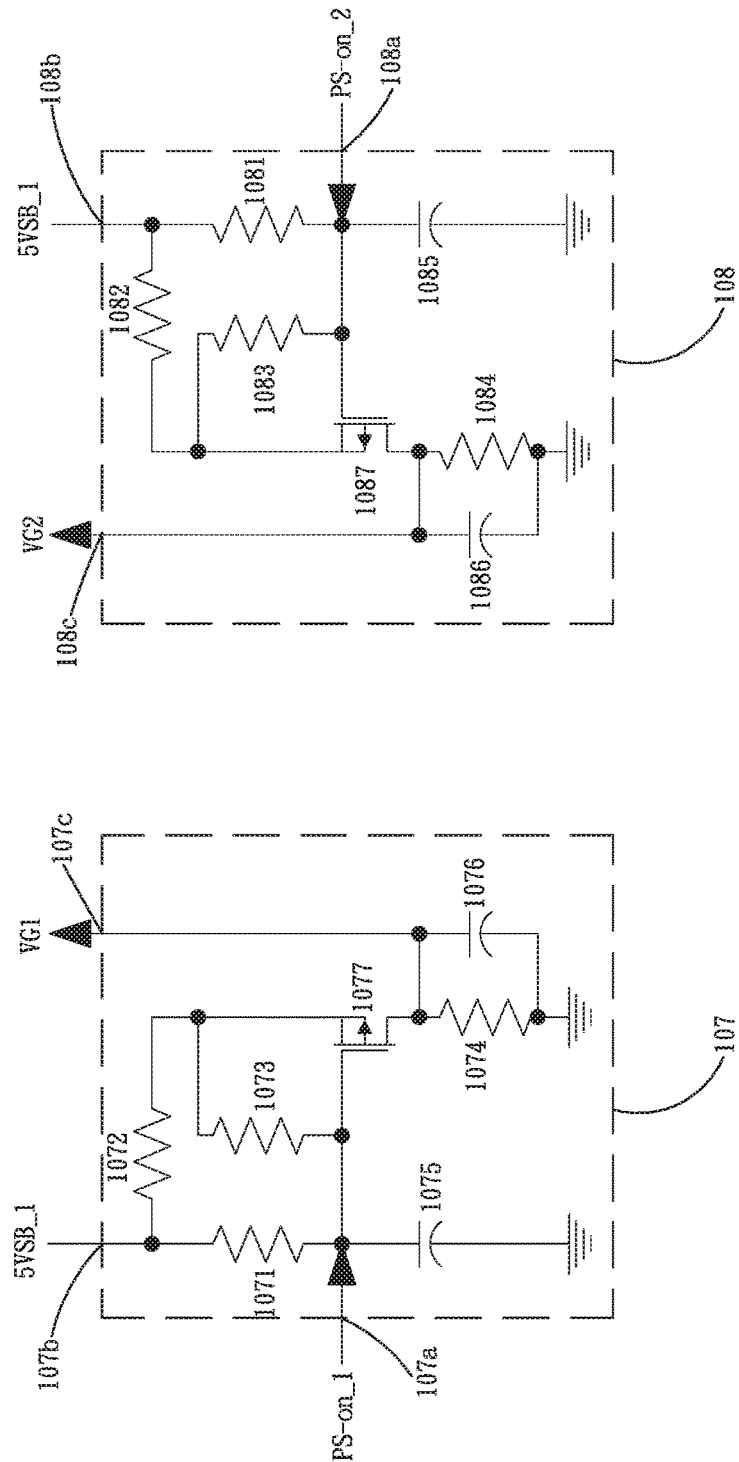
FIG. 4 is a circuit diagram of the first and second drive triggering circuits of the present invention.

Please refer to FIG. 4, which is a circuit diagram of the first and second drive triggering circuits of the present invention. The first drive triggering circuit 107 has a first input end 107a, a second input end 107b and an output end 107c. The second drive triggering circuit 108 has a first input end 108a, a second input end 108b and an output end 108c. The first input end 107a of the first drive triggering circuit 107 is connected to the first output end 105b of the clamp circuit 105. The second input end 107b of the first drive triggering circuit 107 is connected to the standby power reference level 5VSB_1. The first input end 108a of the second drive triggering circuit 108 is connected to the second output end 105c of the clamp circuit 105. The second input end 108b of the second drive triggering circuit 108 is connected to the standby power reference level 5VSB_1.

The first drive triggering circuit 107 includes a first resistor 1071, a second resistor 1072, a third resistor 1073, a fourth resistor 1074, a first capacitor 1075, a second capacitor 1076 and a transistor 1077. The first end of the first resistor 1071 and the first end of the second resistor 1072 are commonly connected. The second end of the second resistor 1072, the first end of the third resistor 1073 and the source of the transistor 1077 are commonly connected. The second end of the first resistor 1071, the second end of the third resistor 1073, the first end of the first capacitor 1075 and the gate of the transistor 1077 are commonly connected. The second end of the first capacitor 1075 is grounded. The drain of the transistor 1077, the first end of the third resistor 1073 and the first end of the second capacitor 1076 are commonly connected. The second end of the third resistor 1073 and the second end of the second capacitor 1076 are commonly grounded. The gate of the transistor 1077 is exactly the first input end 107a of the first drive triggering circuit 107. The first end of the first resistor 1071 is exactly the second input end 107b of the first drive triggering circuit 107. The drain of the transistor 1077 is exactly the output end 107c of the first drive triggering circuit 107.

The second drive triggering circuit 108 includes a first resistor 1081, a second resistor 1082, a third resistor 1083, a fourth resistor 1084, a first capacitor 1085, a second capacitor 1086 and a transistor 1087. The first end of the first resistor 1081 and the first end of the second resistor 1082 are commonly connected. The second end of the second resistor 1082, the first end of the third resistor 1083 and the source of the transistor 1087 are commonly connected. The second end of the first resistor 1081, the second end of the third resistor 1083, the first end of the first capacitor 1085 and the gate of the transistor 1087 are commonly connected. The second end of the first capacitor 1085 is grounded. The drain of the transistor 1087, the first end of the third resistor 1083 and the first end of the second capacitor 1086 are commonly connected. The second end of the third resistor 1083 and the second end of the second capacitor 1086 are commonly grounded. The gate of the transistor 1087 is exactly the first input end 108a of the second drive triggering circuit 108. The first end of the first resistor 1081 is exactly the second input end 108b of the second drive triggering circuit 108. The drain of the transistor 1087 is exactly the output end 108c of the second drive triggering circuit 108.

Please refer to FIGS. 3A and 3B. The first ends of the first resistors 1071, 1081 are connected to the standby power reference level 5VSB_1. The second end of the first resistor 1071 is coupled to the PS-on_1. The second end of the first resistor 1081 is coupled to the PS-on_2. Before the first computer system 3 or the second computer system 4 is activated, only if the first power supply unit 1 is powered on, the PS-on_1 and the PS-on_2 will in the high level.

In the power-coupling working mode, the gate of the transistor 1052 is in the high level and turned on and is simply connected to the first computer system 3. Therefore, when the first computer system 3 is activated to send out the boot-up command, the PS-on_1 will be pulled to the low level and the PS-on_2 will become in the low level due to the turning on of the transistor 1052. Accordingly, the second power supply unit 2 is also activated and the VG1 of the output end 107c and the VG2 of the output end 108c will become in the high level.

In the power-shunting working mode, the gate of the transistor 1052 is in the low level and turned off, whereby PS-on_1 and PS-on_2 will not affect each other. When the first computer system 3 is activated to send out the boot-up command, only the PS-on_1 is pulled to the low level, whereby the VG1 becomes in the high level. When the second computer system 4 is activated to send out the boot-up command, only the PS-on_2 is pulled to the low level, whereby the VG2 becomes in the high level.

Figure 5:
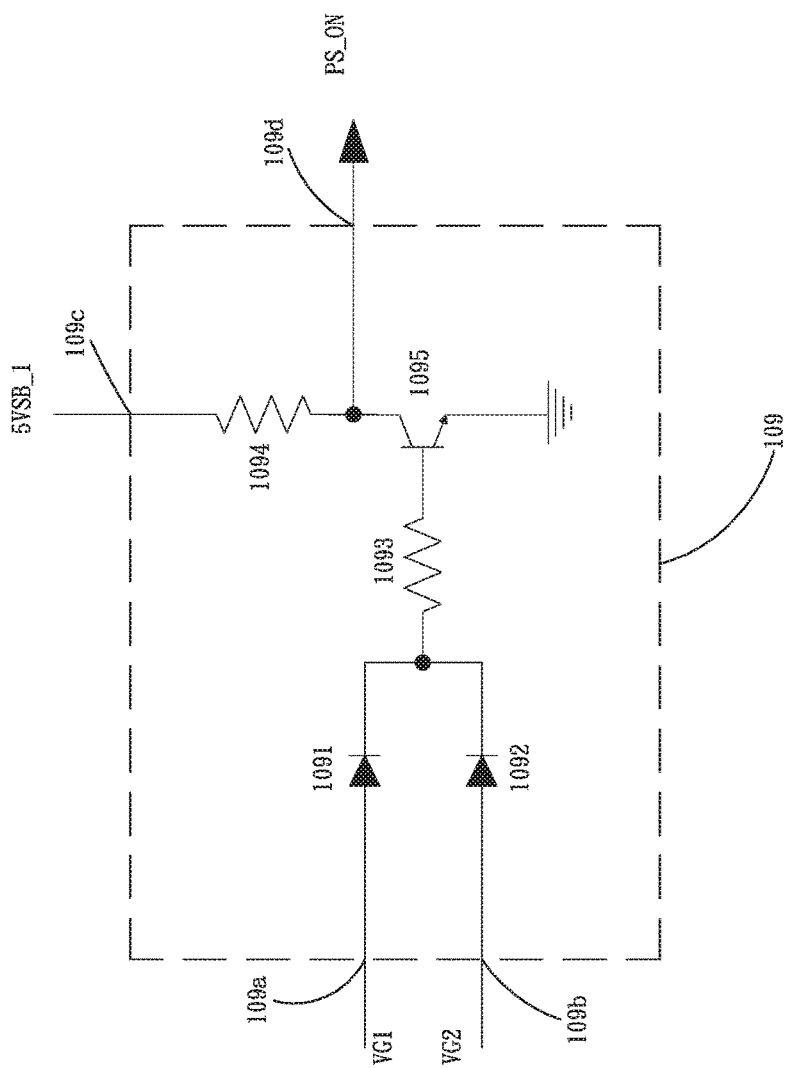
FIG. 5 is a circuit diagram of the drive splicer circuit of the present invention.

Please refer to FIG. 5, which is a circuit diagram of the drive splicer circuit of the present invention. Also supplementally referring to FIG. 4, the drive splicer circuit 109 has a first input end 109*a*, a second input end 109*b*, a third input end 109*c* and an output end 109*d*. The first input end 109*a* of the drive splicer circuit 109 is connected to the output end 107*c* of the first drive triggering circuit 107. The second input end 109*b* of the drive splicer circuit 109 is connected to the output end 108*c* of the second drive triggering circuit 108. The third input end 109*c* of the drive splicer circuit 109 is connected to the standby power reference level 5VSB_1.

The drive splicer circuit 109 includes a first diode 1091, a second diode 1092, a first resistor 1093, a second resistor 1094 and a transistor 1095. The second end of the first diode 1091, the second end of the second diode 1092 and the first end of the first resistor 1093 are commonly connected. The second end of the first resistor 1093 and the base of the transistor 1095 are commonly connected. The second end of the second resistor 1094 and the collector of the transistor 1095 are commonly connected. The emitter of the transistor 1095 is grounded. The first end of the first diode 1091 is exactly the first input end 109*a* of the drive splicer circuit 109. The first end of the second diode 1092 is exactly the second input end 109*b* of the drive splicer circuit 109. The first end of the first resistor 1093 is exactly the third input end 109*c* of the drive splicer circuit 109. The collector of the transistor 1095 is exactly the output end 109*d* of the drive splicer circuit 109.

In the power-coupling working mode, the transistor 1045 is turned on, so that the PS-on_1 of the first computer system 3 and the PS-on_2 will both become in the low level, whereby the VG1 and VG2 become in the high level to turn on the transistor 1095 and the PS_ON of the output end 109*d* will become in the low level. Accordingly, by means of one boot-up command, the first and second power supply units 1, 2 are both activated. However, in practice, when the first computer system 3 gives the boot-up command to the first power supply unit 1 to make the PS-on_1 become in the low level, due to the clamp circuit 105, the PS-on_2 also becomes in the low level and directly outputs VG2 via the second drive trigger circuit 108. Therefore, the second power supply unit 2 will be more quickly activated than the first power supply unit 1. The two power supply units are activated in sequence so as to compensate the time difference in power supply.

In the power-shunting working mode, the transistor 1045 is turned on, the level of VG1 and VG2 is respectively varied with the change of PS-on_1 and PS-on_2. When VG1 or VG2 becomes a the high level, the transistor 1095 is turned on, whereby the PS_ON of the output end 109*d* will become in the low level. Accordingly, the first power supply unit 1 is activated. When any of the first and second computer systems 3, 4 or multiple computer systems is right in the boot-up state, the first power supply unit 1 will keep in the working state. Only when both the first and second computer systems 3, 4 are in the shutdown state, the first power supply unit 1 will stop working.

Figure 6:
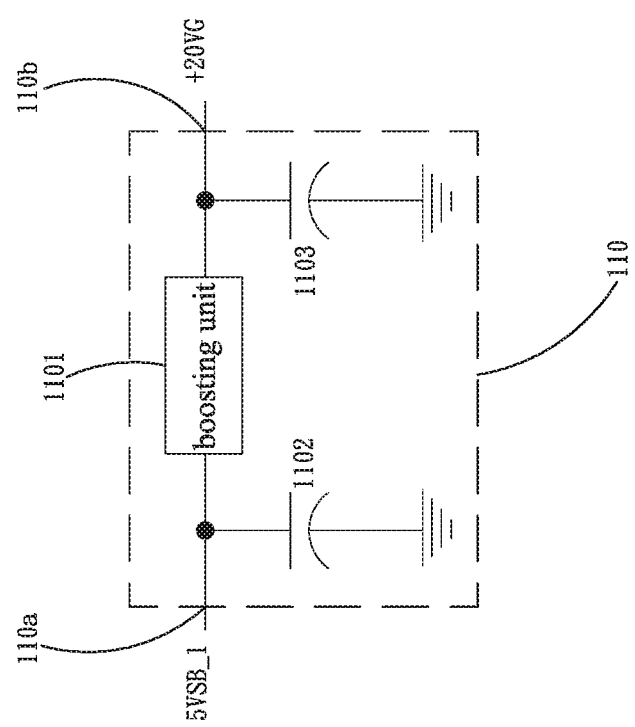
FIG. 6 is a circuit diagram of the boosting circuit of the present invention.

Please refer to FIG. 6, which is a circuit diagram of the boosting circuit of the present invention. The boosting circuit 110 has an input end 110*a* and an output end 110*b*. The boosting circuit 110 includes a boosting unit 1101, a first capacitor 1102 and a second capacitor 1103. The first end of the boosting unit 1101 is connected to the first end of the first capacitor 1102. The second end of the boosting unit 1101 is connected to the first end of the second capacitor 1103. The second ends of the first and second capacitors 1102, 1103 are grounded. The first end of the boosting unit 1101 is exactly the input end 110*a*. The second end of the boosting unit 1101 is exactly the output end 110*b*. The input end 110*a* of the boosting circuit 110 is connected to the standby power reference level 5VSB_1. By means of the boosting unit 1101, the voltage is such increased as to be enough to drive the successive circuits and fully turn on the transistor component and is output from the output end 110*b* to supply power for the successive circuits to use.

Figure 7:
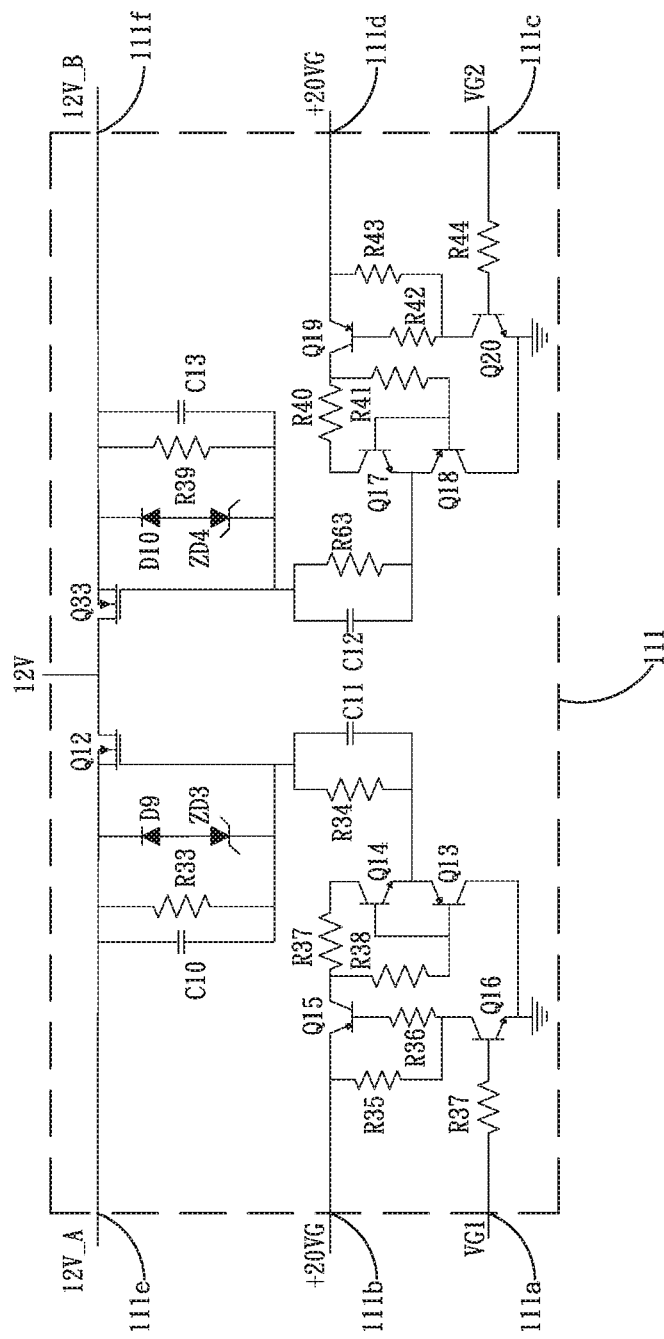
FIG. 7 is a circuit diagram of the first output voltage switching control circuit of the present invention.

Please refer to FIG. 7, which is a circuit diagram of the first output voltage switching control circuit of the present invention. The first output voltage switching control circuit 111 serves to control the 12V output of the first power supply unit 1. The first output voltage switching control circuit 111 has a first drive signal input end 111*a*, a first drive voltage input end 111*b*, a second drive signal input end 111*c*, a second drive voltage input end 111*d*, a first load connection end 111*e* and a second load connection end 111*f*. The first drive signal input end 111*a* is connected to the output end 107*c* of the first drive triggering circuit 107. The second drive signal input end 111*c* is connected to the output end 108*c* of the second drive triggering circuit 108. The first drive voltage input end 111*b* and the second drive voltage input end 111*d* are respectively connected to the output end 110*b* of the boosting circuit 110.

In FIG. 7, the power transistors Q12, Q33 are the main switches. The 12V_A of the first load connection end 111*e* is the output/input voltage of the first power supply unit 1. The 12V_B of the second load connection end 111*f* is the output/input voltage of the second power supply unit 2. ZD3 and D9 are the voltage clampers of the power transistor Q12. ZD4 and D10 are the voltage clampers of the power transistor Q33 for protecting the voltage Vgs of the power transistors Q12, Q33 from being greater than the nominal anti-voltage ability. C10, R33, C13, R39 are soft start damps and cooperate with R34, C11 and R63, C12 to form the micro-adjustable turn-on time of the power transistors Q12, Q33. Q13, Q14 and Q17, Q18 are drive circuits to provide sufficient turn-on and draining ability for the drive time of the power transistors Q12, Q33. According to the command of VG1 and VG2, Q15, Q16 and Q19, Q20 decide whether to provide energy for the drive circuit.

The first drive voltage input end 111*b* and the second drive voltage input end 111*d* receive the voltage output from the output end 110*b* of the boosting circuit 110. In order to provide complete drive voltage (about 8V) for the power transistors Q12, Q33 (N-MOSFET), the boosting circuit 110 needs to increase the 5V provided by the standby power reference level 5VSB_1 to 20V (about 4 times) for driving the successive circuits (12V) and fully turning on the transistor components (8V). According to the sort of the selected power transistors Q12, Q33 or the breakthrough improvement of future technique, when the full drive voltage of the power transistors Q12, Q33 varies, the multiplying power of the boosting of the boosting circuit 110 is also changed along therewith in adaptation to the change in practical use.

Figure 8:
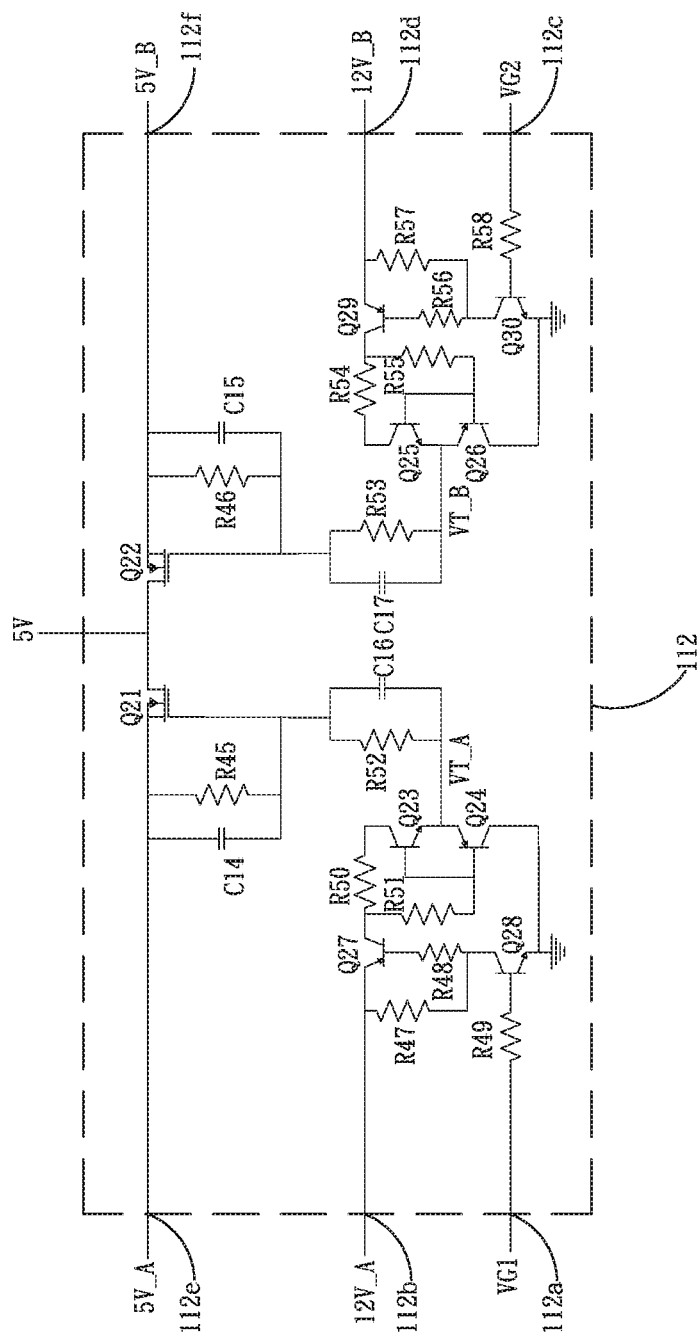
FIG. 8 is a circuit diagram of the second output voltage switching control circuit of the present invention.

Please refer to FIG. 8, which is a circuit diagram of the second output voltage switching control circuit of the present invention. The second output voltage switching control circuit 112 serves to control the 5V output of the first power supply unit 1. The second output voltage switching control circuit 112 has a first drive signal input end 112*a*, a first drive voltage input end 112*b*, a second drive signal input end 112*c*, a second drive voltage input end 112*d*, a first load connection end 112*e* and a second load connection end 112*f*. The first drive signal input end 112*a* is connected to the output end 107*c* of the first drive triggering circuit 107. The second drive signal input end 112*c* is connected to the output end 108*c* of the second drive triggering circuit 108. The first drive voltage input end 112*b* of the second output voltage switching control circuit 112 is connected to first load connection end 111*e* of the first output voltage switching control circuit 111. The second drive voltage input end 112*d* of the second output voltage switching control circuit 112 is connected to the second load connection end 111*f* of the first output voltage switching control circuit 111.

The internal structure in FIG. 8 is similar to the composition of FIG. 7 and the working principle is also substantially identical to that of FIG. 7 and thus will not be repeatedly described hereinafter. The difference is that the drive voltage needed by the first drive voltage input end 112*b* and the second drive voltage input end 112*d* is provided by 12V output from the first and second load connection ends 111*e*, 111*f* of the first output voltage switching control circuit 111. The object is to identify that the first output voltage switching control circuit 111 is the main energy of the first power supply unit 1. If the first output voltage switching control circuit 111 does not operate, it is unnecessary for the second output voltage switching control circuit 112 to output.

Figure 9:
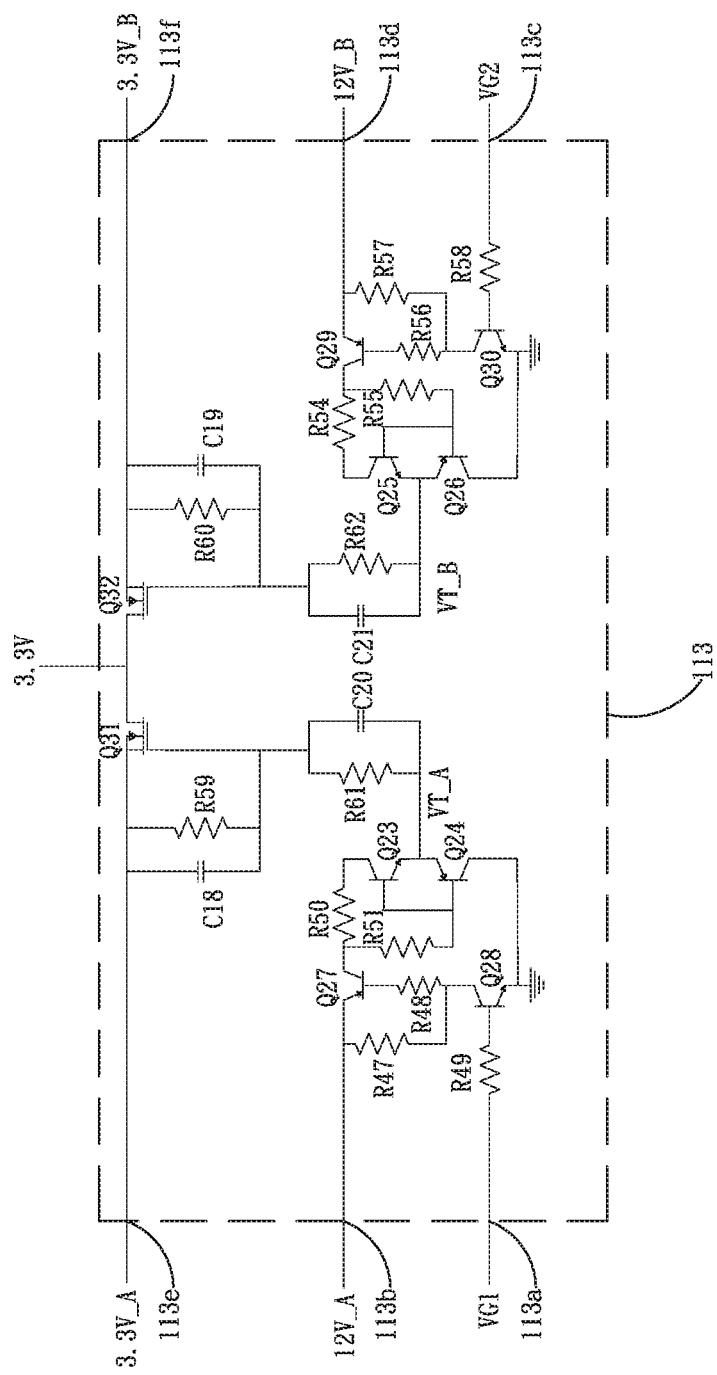
FIG. 9 is a circuit diagram of the third output voltage switching control circuit of the present invention.

Please refer to FIG. 9, which is a circuit diagram of the third output voltage switching control circuit of the present invention. The third output voltage switching control circuit 113 serves to control the 3.3V output of the first power supply unit 1. The third output voltage switching control circuit 113 has a first drive signal input end 113*a*, a first drive voltage input end 113*b*, a second drive signal input end 113*c*, a second drive voltage input end 113*d*, a first load connection end 113*e* and a second load connection end 113*f*. The first drive signal input end 113*a* is connected to the output end 107*c* of the first drive triggering circuit 107. The second drive signal input end 113*c* is connected to the output end 108*c* of the second drive triggering circuit 108. The first drive voltage input end 113*b* of the third output voltage switching control circuit 113 is connected to first load connection end 111*e* of the first output voltage switching control circuit 111. The second drive voltage input end 113*d* of the third output voltage switching control circuit 113 is connected to the second load connection end 111*f* of the first output voltage switching control circuit 111.

The internal structure in FIG. 9 is similar to the composition of FIG. 7 and the working principle is also substantially identical to that of FIG. 7 and thus will not be repeatedly described hereinafter. The difference is that the drive voltage needed by the first drive voltage input end 113*b* and the second drive voltage input end 113*d* is provided by 12V output from the first and second load connection ends 111*e*, 111*f* of the first output voltage switching control circuit 111. The object is to identify that the first output voltage switching control circuit 111 is the main energy of the first power supply unit 1. If the first output voltage switching control circuit 111 does not operate, it is unnecessary for the third output voltage switching control circuit 113 to output.

The control commands of the power transistors Q21, Q22 in FIG. 8 and the power transistors Q31, Q32 in FIG. 9 can be provided by VT_A and VT_B. Also, the requirement of micro-adjustment of the turn-on time of the power transistors Q21, Q22 and the power transistors Q31, Q32 is reserved.

In the power-coupling working mode, the PS-on_2 signal is restrained by the PS-on_1 signal. Therefore, when the first computer system 3 is activated to lower the PS-on_1 signal into the low level, both the first and second power supply units 1, 2 are activated and both the VG1, VG2 are in the high level. It can be known that the switches Q12, Q33 of the first output voltage switching control circuit 111, the switches Q21, Q22 of the second output voltage switching control circuit 112 and the switches Q31, Q32 of the third output voltage switching control circuit 113 are all driven and turned on. At this time, the powers 12V_B, 5V_B, 3.3V_B generated by the second power supply unit 2 are coupled to the powers 12V_A, 5V_A, 3.3V_A generated by the first power supply unit 1 to achieve the power-coupling effect.

In the power-shunting working mode, the PS-on_1 signal and the PS-on_2 signal are independently controlled by the first and second computer systems 3 and 4. When any computer system is activated to send out the boot-up command, the VG1 or VG2 signal becomes in the high level so that the first power supply unit 1 sends out PS-ON to activate the first power supply unit 1 and provide three sets of output voltages of 12V, 5V and 3.3V. For example, when the first computer system 3 is booted up, VG1 becomes in the high level and the switches Q12, Q21, Q31 are turned on to send 12V, 5V and 3.3V to 12V_A, 5V_A and 3.3V_A so as to provide the necessary working energy for the first computer system 3. When the second computer system 4 is also booted up, VG2 becomes in the high level and the switches Q33, Q22, Q32 are turned on to send 12V, 5V and 3.3V to 12V_B, 5V_B and 3.3 V_B so as to provide the necessary working energy for the second computer system 4.

Figure 10:
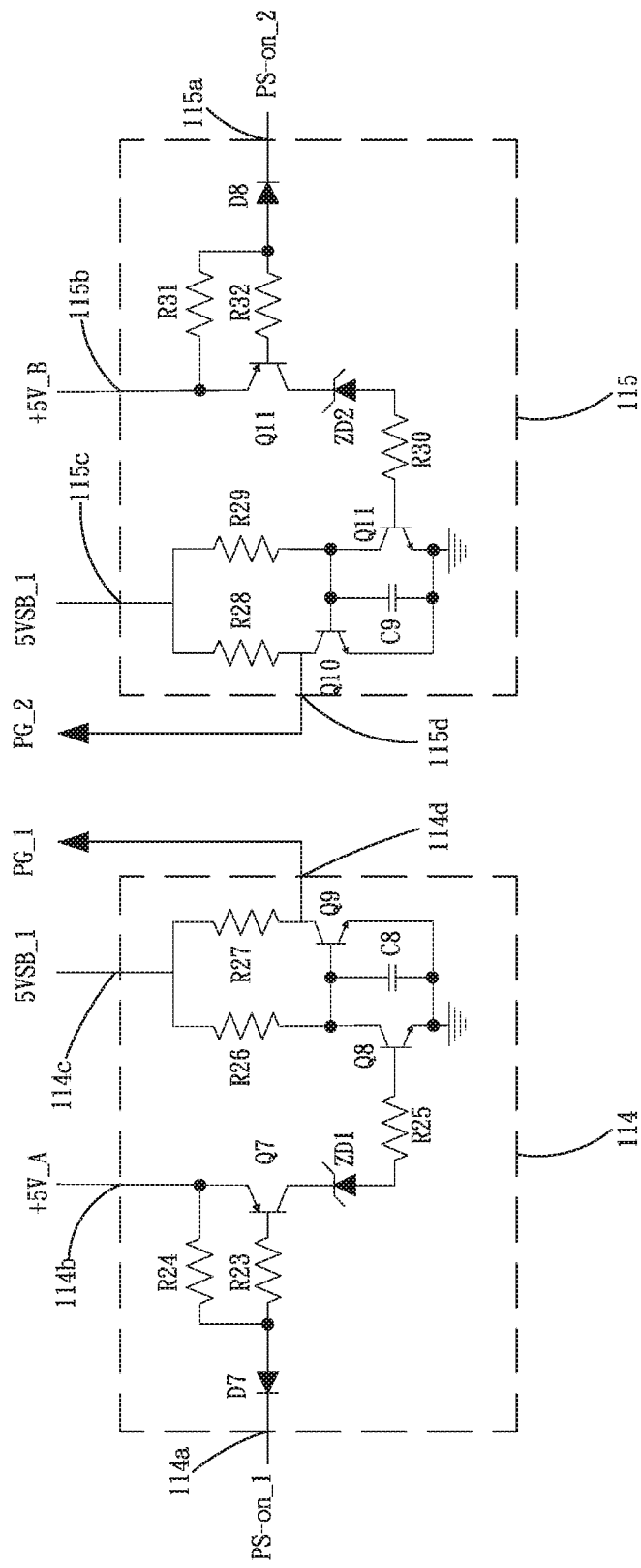
FIG. 10 is a circuit diagram of the first and second power good signal generation circuits of the present invention.

Please refer to FIG. 10, which is a circuit diagram of the first and second power good signal generation circuits of the present invention. The first and second power good signal generation circuits serve to generate power good signals. The first power good signal generation circuit 114 has a first input end 114*a*, a second input end 114*b*, a third input end 114*c* and an output end 114*d*. The first input end 114*a* of the first power good signal generation circuit 114 is connected to the first output end 105*b* of the clamp circuit 105. The second input end 114*b* of the first power good signal generation circuit 114 is connected to the first load connection end 112*e* of the second output voltage switching control circuit 112. The third input end 114*c* of the first power good signal generation circuit 114 is connected to the standby power reference level 5VSB_1. The output end 114*d* of the first power good signal generation circuit 114 outputs a first power good signal PG_1. The second power good signal generation circuit 115 has a first input end 115*a*, a second input end 115*b*, a third input end 115*c* and an output end 115*d*. The first input end 115*a* of the second power good signal generation circuit 115 is connected to the second output end 105*c* of the clamp circuit 105. The second input end 115*b* of the second power good signal generation circuit 115 is connected to the second load connection end 112*f* of the second output voltage switching control circuit 112. The third input end 115*c* of the second power good signal generation circuit 115 is connected to the standby power reference level 5VSB_1. The output end 115*d* of the second power good signal generation circuit 115 outputs a second power good signal PG_2.

Before the mainframe system corresponding to PS-on_1 and the PS-on_2 sends out the boot-up command, no matter whether the current working mode is judged, the first power good signal PG_1 and the second power good signal PG_2 will keep in the low level due to R26, Q9 and R29, Q10.

When any of PS-on_1 and PS-on_2 becomes in the low level, the Q7 and Q8 are turned on to respectively pull 5V_A or 5V_B to ZD1 or ZD2. In case the voltage is higher than ZD1 or ZD2, the corresponding Q9 and Q10 will be turned on to raise PG_1 or PG_2.

In the power-coupling working mode, the PG_2 is not actually connected to the load, (for example, the second computer system 4), so that the PG_2 is deemed an invalid signal.

In the power-shunting working mode, PG_1 or PG_2 correctly judges whether the output voltage 5V_A and 5V_B reach the threshold voltage of ZD1 or ZD2. In addition, when the PS-on_1 and PS-on_2 receive the shutdown commands (level raised) of the first and second computer systems 3 and 4, Q7 and Q10 will be immediately shut down and PG_1 or PG_2 will immediately goes back to the low level. At this time, the second capacitors 1076, 1086 are electrolytic capacitors so that VG1 and VG2 will keep in the high level for a period of time to drive the output switches of the three sets of voltages. This meets the requirement that when ATX power is shut down, the level of the PG signal needs to be pull down earlier than the power signal.

Figure 11:
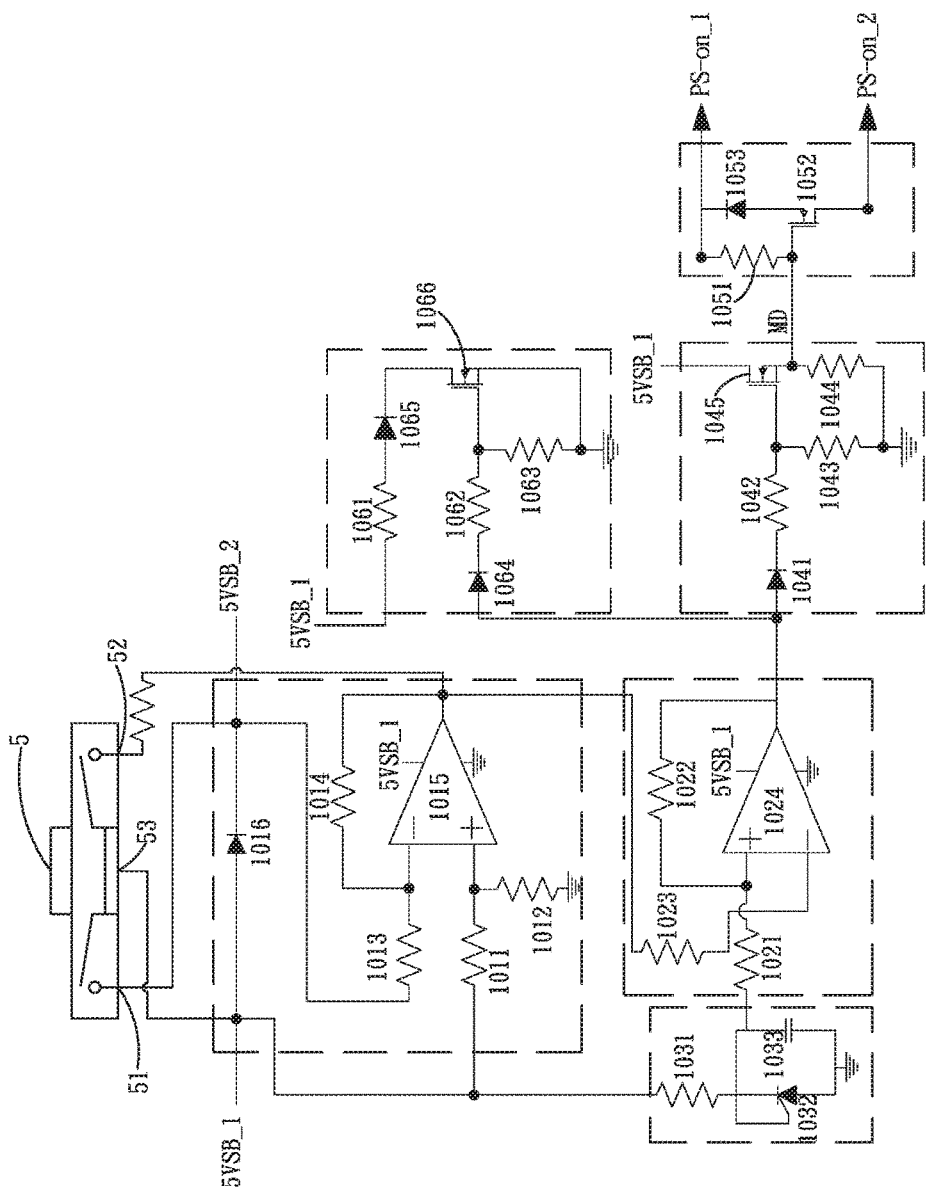
FIG. 11 is a circuit diagram of a second embodiment of the power supply unit of the present invention.

Please refer to FIG. 11, which is a circuit diagram of a second embodiment of the power supply unit of the present invention. Also supplementally referring to FIGS. 3A and 3B, the second embodiment is substantially identical to the first embodiment and thus will not be repeatedly described hereinafter. The second embodiment is different from the first embodiment in that the voltage difference amplification circuit 101 is connected to a selection switch 5. The selection switch 5 has a first contact 51, a second contact 52 and a common contact 53. The first contact 51 is connected to the second input end 101*b* of the voltage difference amplification circuit 101. The second contact 52 is connected to the output end 101*c* of the voltage difference amplification circuit 101. The common contact 53 is connected to the first input end 101*a* of the voltage difference amplification circuit 101.

When the operation button of the selection switch 5 is shifted leftward, the first contact 51 and the common contact 53 are short-circuited to force the first power supply unit 1 into the power-coupling working mode. At the same time, the light-emitting diode 1065 emits light. When the operation button of the selection switch 5 is shifted rightward, the second contact 52 and the common contact 53 are short-circuited to force the first power supply unit 1 into the power-shunting working mode. By means of the selection switch 5, the voltage difference amplification circuit 101 is invalidated, whereby the power supply unit is forced into the power-coupling working mode or the power-shunting working mode.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A computer power supply unit with output mode determining function, comprising:
   a voltage difference amplification circuit having a first input end, a second input end and an output end, a diode being disposed between the first and second input ends;
   a comparison circuit having a first input end, a second input end and an output end, the second input end of the comparison circuit being connected to the output end of the voltage difference amplification circuit;
   a linear voltage regulator circuit having a first end and a second end, the first end of the linear voltage regulator circuit being connected to the first input end of the voltage difference amplification circuit, the second end of the linear voltage regulator circuit being connected to the first input end of the comparison circuit to output a constant voltage;
   a drive circuit having a first input end, a second input end and an output end, the first input end of the drive circuit being connected to the output end of the comparison circuit; and
   a clamp circuit having an input end, a first output end and a second output end, the input end of the clamp circuit being connected to the output end of the drive circuit, according to whether the diode generates turn-on bias, the voltage difference amplification circuit outputting a first voltage level, according to the first voltage level and the value of the constant voltage, the comparison circuit outputting a second voltage level, whereby according to the value of the second voltage level, the drive circuit drives or does not drive the clamp circuit so as to judge the output mode of the power supply unit.

2. The computer power supply unit with output mode determining function as claimed in claim 1, wherein the comparison circuit is connected to a display circuit, the display circuit having a first input end and a second input end, the first input end of the display circuit being connected to the output end of the comparison circuit.

3. The computer power supply unit with output mode determining function as claimed in claim 2, wherein the display circuit includes a first resistor, a second resistor, a third resistor, a diode, a light-emitting diode and a transistor, the second end of the first resistor and the first end of the light-emitting diode being commonly connected, the second end of the light-emitting diode and the drain of the transistor being commonly connected, the second end of the diode and the first end of the second resistor being commonly connected, the second end of the second resistor, the first end of the third resistor and the gate of the transistor being commonly connected, the source of the transistor and the second end of the third resistor being commonly grounded, the first end of the first resistor being exactly the second input end of the display circuit, the first end of the diode being exactly the first input end of the display circuit.

4. The computer power supply unit with output mode determining function as claimed in claim 2, wherein the first input end of the voltage difference amplification circuit, the second input end of the drive circuit and the second input end of the display circuit are connected to a standby power reference level.

5. The computer power supply unit with output mode determining function as claimed in claim 1, wherein the voltage difference amplification circuit includes a first resistor, a second resistor, a third resistor, a fourth resistor and an amplifier, the second end of the first resistor, the first end of the second resistor and the non-inverting input end of the amplifier being commonly connected, the first end of the first resistor being exactly the first input end of the voltage difference amplification circuit, the second end of the second resistor being grounded, the second end of the third resistor, the first end of the fourth resistor and the inverting input end of the amplifier being commonly connected, the first end of the third resistor being exactly the second input end of the voltage difference amplification circuit, the second end of the fourth resistor being connected to the output end of the amplifier, the output end of the amplifier being exactly the output end of the voltage difference amplification circuit.

6. The computer power supply unit with output mode determining function as claimed in claim 1, wherein the comparison circuit includes a first resistor, a second resistor, a third resistor and an amplifier, the second end of the first resistor, the first end of the second resistor and the non-inverting input end of the amplifier being commonly connected, the first end of the first resistor being exactly the first input end of the comparison circuit, the second end of the second resistor being connected to the output end of the amplifier, the second end of the third resistor being serially connected to the inverting input end of the amplifier, the first end of the third resistor being exactly the second input end of the comparison circuit, the output end of the amplifier being exactly the output end of the comparison circuit.

7. The computer power supply unit with output mode determining function as claimed in claim 1, wherein the linear voltage regulator circuit includes a first resistor, a voltage regulation member and a first capacitor, the second end of the first resistor and the second end of the voltage regulation member being commonly connected, the first end of the first capacitor and the third end of the voltage regulation member being commonly connected, the second end of the first capacitor and the first end of the voltage regulation member being commonly grounded, the first end of the first resistor being exactly the first end of the linear voltage regulator circuit, the commonly connected point of the first end of the first capacitor and the third end of the voltage regulation member being exactly the second end of the linear voltage regulator circuit.

8. The computer power supply unit with output mode determining function as claimed in claim 1, wherein the drive circuit includes a diode, a first resistor, a second resistor, a third resistor and a transistor, the second end of the diode and the first end of the first resistor being commonly connected, the second end of the first resistor, the first end of the second resistor and the gate of the transistor being commonly connected, the second end of the second resistor and the second end of the third resistor being commonly grounded, the first end of the third resistor and the source of the transistor being commonly connected, the drain of the transistor being exactly the second input end of the drive circuit, the source of the transistor being exactly the output end of the drive circuit.

9. The computer power supply unit with output mode determining function as claimed in claim 1, wherein the clamp circuit includes a first resistor, a transistor and a diode, the second end of the first resistor and the gate of the transistor being commonly connected, the first end of the diode and the source of the transistor being commonly connected, the second end of the diode and the second end of the first resistor being commonly connected, the gate of the transistor being exactly the input end of the clamp circuit, the second end of the diode being exactly the first output end of the clamp circuit, the drain of the transistor being exactly the second output end of the clamp circuit.

10. The computer power supply unit with output mode determining function as claimed in claim 4, wherein the clamp circuit is connected to a first drive triggering circuit and a second drive triggering circuit, the first drive triggering circuit having a first input end, a second input end and an output end, the second drive triggering circuit having a first input end, a second input end and an output end, the first input end of the first drive triggering circuit being connected to the first output end of the clamp circuit, the second input end of the first drive triggering circuit being connected to the standby power reference level, the first input end of the second drive triggering circuit being connected to the second output end of the clamp circuit, the second input end of the second drive triggering circuit being connected to the standby power reference level.

11. The computer power supply unit with output mode determining function as claimed in claim 10, wherein the first drive triggering circuit includes a first resistor, a second resistor, a third resistor, a fourth resistor, a first capacitor, a second capacitor and a transistor, the first end of the first resistor and the first end of the second resistor being commonly connected, the second end of the second resistor, the first end of the third resistor and the source of the transistor being commonly connected, the second end of the first resistor, the second end of the third resistor, the first end of the first capacitor and the gate of the transistor being commonly connected, the second end of the first capacitor being grounded, the drain of the transistor, the first end of the third resistor and the first end of the second capacitor being commonly connected, the second end of the third resistor and the second end of the second capacitor being commonly grounded, the gate of the transistor being exactly the first input end of the first drive triggering circuit, the first end of the first resistor being exactly the second input end of the first drive triggering circuit, the drain of the transistor being exactly the output end of the first drive triggering circuit.

12. The computer power supply unit with output mode determining function as claimed in claim 10, wherein the second drive triggering circuit includes a first resistor, a second resistor, a third resistor, a fourth resistor, a first capacitor, a second capacitor and a transistor, the first end of the first resistor and the first end of the second resistor being commonly connected, the second end of the second resistor, the first end of the third resistor and the source of the transistor being commonly connected, the second end of the first resistor, the second end of the third resistor, the first end of the first capacitor and the gate of the transistor being commonly connected, the second end of the first capacitor being grounded, the drain of the transistor, the first end of the third resistor and the first end of the second capacitor being commonly connected, the second end of the third resistor and the second end of the second capacitor being commonly grounded, the gate of the transistor being exactly the first input end of the second drive triggering circuit, the first end of the first resistor being exactly the second input end of the second drive triggering circuit, the drain of the transistor being exactly the output end of the second drive triggering circuit.

13. The computer power supply unit with output mode determining function as claimed in claim 10, wherein the first and second drive triggering circuits are commonly connected to a drive splicer circuit, the drive splicer circuit having a first input end, a second input end, a third input end and an output end, the first input end of the drive splicer circuit being connected to the output end of the first drive triggering circuit, the second input end of the drive splicer circuit being connected to the output end of the second drive triggering circuit, the third input end of the drive splicer circuit being connected to the standby power reference level.

14. The computer power supply unit with output mode determining function as claimed in claim 13, wherein the drive splicer circuit includes a first diode, a second diode, a first resistor, a second resistor and a transistor, the second end of the first diode, the second end of the second diode and the first end of the first resistor being commonly connected, the second end of the first resistor and the base of the transistor being commonly connected, the second end of the second resistor and the collector of the transistor being commonly connected, the emitter of the transistor being grounded, the first end of the first diode being exactly the first input end of the drive splicer circuit, the first end of the second diode being exactly the second input end of the drive splicer circuit, the first end of the first resistor being exactly the third input end of the drive splicer circuit, the collector of the transistor being exactly the output end of the drive splicer circuit.

15. The computer power supply unit with output mode determining function as claimed in claim 10, wherein the standby power reference level is connected to a boosting circuit, the boosting circuit having an input end and an output end, the boosting circuit including a boosting unit, a first capacitor and a second capacitor, the first end of the boosting unit being connected to the first end of the first capacitor, the second end of the boosting unit being connected to the first end of the second capacitor, the second ends of the first and second capacitors being grounded, the first end of the boosting unit being exactly the input end, the second end of the boosting unit being exactly the output end.

16. The computer power supply unit with output mode determining function as claimed in claim 15, wherein the first drive triggering circuit, the second drive triggering circuit and the boosting circuit are connected to a first output voltage switching control circuit, the first output voltage switching control circuit having a first drive signal input end, a first drive voltage input end, a second drive signal input end, a second drive voltage input end, a first load connection end and a second load connection end, the first drive signal input end being connected to the output end of the first drive triggering circuit, the second drive signal input end being connected to the output end of the second drive triggering circuit, the first drive voltage input end and the second drive voltage input end being respectively connected to the output end of the boosting circuit.

17. The computer power supply unit with output mode determining function as claimed in claim 16, wherein the first drive triggering circuit, the second drive triggering circuit and the first output voltage switching control circuit are connected to a second output voltage switching control circuit, the second output voltage switching control circuit having a first drive signal input end, a first drive voltage input end, a second drive signal input end, a second drive voltage input end, a first load connection end and a second load connection end, the first drive signal input end being connected to the output end of the first drive triggering circuit, the second drive signal input end being connected to the output end of the second drive triggering circuit, the first drive voltage input end of the second output voltage switching control circuit being connected to the first load connection end of the first output voltage switching control circuit, the second drive voltage input end of the second output voltage switching control circuit being connected to the second load connection end of the first output voltage switching control circuit.

18. The computer power supply unit with output mode determining function as claimed in claim 16, wherein the first drive triggering circuit, the second drive triggering circuit and the first output voltage switching control circuit are connected to a third output voltage switching control circuit, the third output voltage switching control circuit having a first drive signal input end, a first drive voltage input end, a second drive signal input end, a second drive voltage input end, a first load connection end and a second load connection end, the first drive signal input end being connected to the output end of the first drive triggering circuit, the second drive signal input end being connected to the output end of the second drive triggering circuit, the first drive voltage input end of the third output voltage switching control circuit being connected to the first load connection end of the first output voltage switching control circuit, the second drive voltage input end of the third output voltage switching control circuit being connected to the second load connection end of the first output voltage switching control circuit.

19. The computer power supply unit with output mode determining function as claimed in claim 17, wherein the clamp circuit, the standby power reference level and the second output voltage switching control circuit are connected to a first power good signal generation circuit and a second power good signal generation circuit, the first power good signal generation circuit having a first input end, a second input end, a third input end and an output end, the first input end of the first power good signal generation circuit being connected to the first output end of the clamp circuit, the second input end of the first power good signal generation circuit being connected to the first load connection end of the second output voltage switching control circuit, the third input end of the first power good signal generation circuit being connected to the standby power reference level, the output end of the first power good signal generation circuit outputting a first power good signal, the second power good signal generation circuit having a first input end, a second input end, a third input end and an output end, the first input end of the second power good signal generation circuit being connected to the second output end of the clamp circuit, the second input end of the second power good signal generation circuit being connected to the second load connection end of the second output voltage switching control circuit, the third input end of the second power good signal generation circuit being connected to the standby power reference level, the output end of the second power good signal generation circuit outputting a second power good signal.

20. The computer power supply unit with output mode determining function as claimed in claim 1, wherein the voltage difference amplification circuit is connected to a selection switch, the selection switch having a first contact, a second contact and a common contact, the first contact being connected to the second input end of the voltage difference amplification circuit, the second contact being connected to the output end of the voltage difference amplification circuit, the common contact being connected to the first input end of the voltage difference amplification circuit.

* * * * *